(12) United States Patent
Gasparakis et al.

(10) Patent No.: US 9,411,725 B2
(45) Date of Patent: Aug. 9, 2016

(54) APPLICATION-RESERVED CACHE FOR DIRECT I/O

(75) Inventors: Iosif Gasparakis, Tigard, OR (US); Peter P. Waskiewicz, Jr., Portland, OR (US)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 13/993,620

(22) PCT Filed: Mar. 22, 2012

(86) PCT No.: PCT/US2012/030205
§ 371 (c)(1),
(2), (4) Date: Jun. 12, 2013

(87) PCT Pub. No.: WO2013/141871
PCT Pub. Date: Sep. 26, 2013

(65) Prior Publication Data
US 2013/0318303 A1    Nov. 28, 2013

(51) Int. Cl.
*G06F 12/08* (2016.01)
*G06F 9/50* (2006.01)

(52) U.S. Cl.
CPC .......... *G06F 12/0802* (2013.01); *G06F 9/5016* (2013.01); *G06F 2209/5014* (2013.01)

(58) Field of Classification Search
None
See application file for complete search history.

(56) References Cited

U.S. PATENT DOCUMENTS

| 5,895,495 | A | * | 4/1999 | Arimilli et al. ............... 711/156 |
| 6,574,682 | B1 | | 6/2003 | Chan |
| 2006/0080398 | A1 | | 4/2006 | Hoover et al. |
| 2006/0112226 | A1 | * | 5/2006 | Hady ..................... G06F 15/167 711/130 |
| 2007/0214307 | A1 | | 9/2007 | Huggahalli et al. |
| 2008/0022049 | A1 | * | 1/2008 | Hughes ................. G06F 12/084 711/130 |
| 2008/0098179 | A1 | * | 4/2008 | Kilbane ............... G06F 12/084 711/147 |
| 2009/0132780 | A1 | | 5/2009 | Maier et al. |
| 2009/0328047 | A1 | * | 12/2009 | Li et al. ......................... 718/102 |
| 2010/0098225 | A1 | * | 4/2010 | Ashton et al. ............... 379/88.18 |
| 2011/0055482 | A1 | * | 3/2011 | So et al. ........................ 711/122 |
| 2012/0254882 | A1 | * | 10/2012 | Makljenovic ......... G06F 9/5011 718/103 |

OTHER PUBLICATIONS

International Search Report and Written Opinion for PCT/US2012/030205, mailed Nov. 28, 2012, 7 pages.
International Preliminary Report on Patentability mailed Oct. 2, 2014 for International Application No. PCT/US2012/030205, 6 pages.

* cited by examiner

*Primary Examiner* — Jared Rutz
*Assistant Examiner* — William E Baughman
(74) *Attorney, Agent, or Firm* — Schwabe, Williamson & Wyatt, P.C.

(57) ABSTRACT

Described are embodiments of mediums, methods, and systems for application-reserved use of cache for direct I/O. A method for using application-reserved cache may include reserving, by one of a plurality of cores of a processor, use of a first portion of one of a plurality of levels of cache for an application executed by the one of the plurality of cores, and transferring, by the one of the plurality of cores, data associated with the application from an input/output (I/O) device of a computing device directly to the first portion of the one of the plurality of levels of the cache. Other embodiments may be described and claimed.

15 Claims, 4 Drawing Sheets

APPLICATION-RESERVED CACHE FOR DIRECT I/O

CROSS REFERENCE TO RELATED APPLICATION

The present application is a national phase entry under 35 U.S.C. §371 of International Application No. PCT/US2012/030205, filed Mar. 22, 2012, entitled "APPLICATION-RESERVED CACHE FOR DIRECT I/O," which designates, among the various States, the United States of America, and the entire contents and disclosures of which are hereby incorporated by reference in their entireties.

TECHNICAL FIELD

Embodiments of the present disclosure relate generally to reserving cache of a computer apparatus for direct input/output (I/O).

BACKGROUND INFORMATION

In high speed and throughput network workloads, the central processing unit (CPU) caches may quickly become less efficient because there may be several applications, daemons, operating system related tasks, timers, threads, and the like, competing for the limited CPU cache resources.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Embodiments of the present disclosure may relate to directly transferring I/O data to cache that has been reserved for an application. According to one embodiment, one or more portions of cache may be dedicated or reserved for use by a particular application. Data may then be streamed directly to and/or directly from the cache during I/O reads and writes without intermediately storing the data in system memory, such as random access memory (RAM). Advantageously, storing I/O data directly into application-reserved cache may increase the speed with which the application may process streaming I/O data. According to one embodiment, the application may be a network application, and one core of a multi-core processor may be reserved or dedicated to running the network application.

Various aspects of the illustrative embodiments will be described using terms commonly employed by those skilled in the art to convey the substance of their work to others skilled in the art. However, it will be apparent to those skilled in the art that some alternate embodiments may be practiced using portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
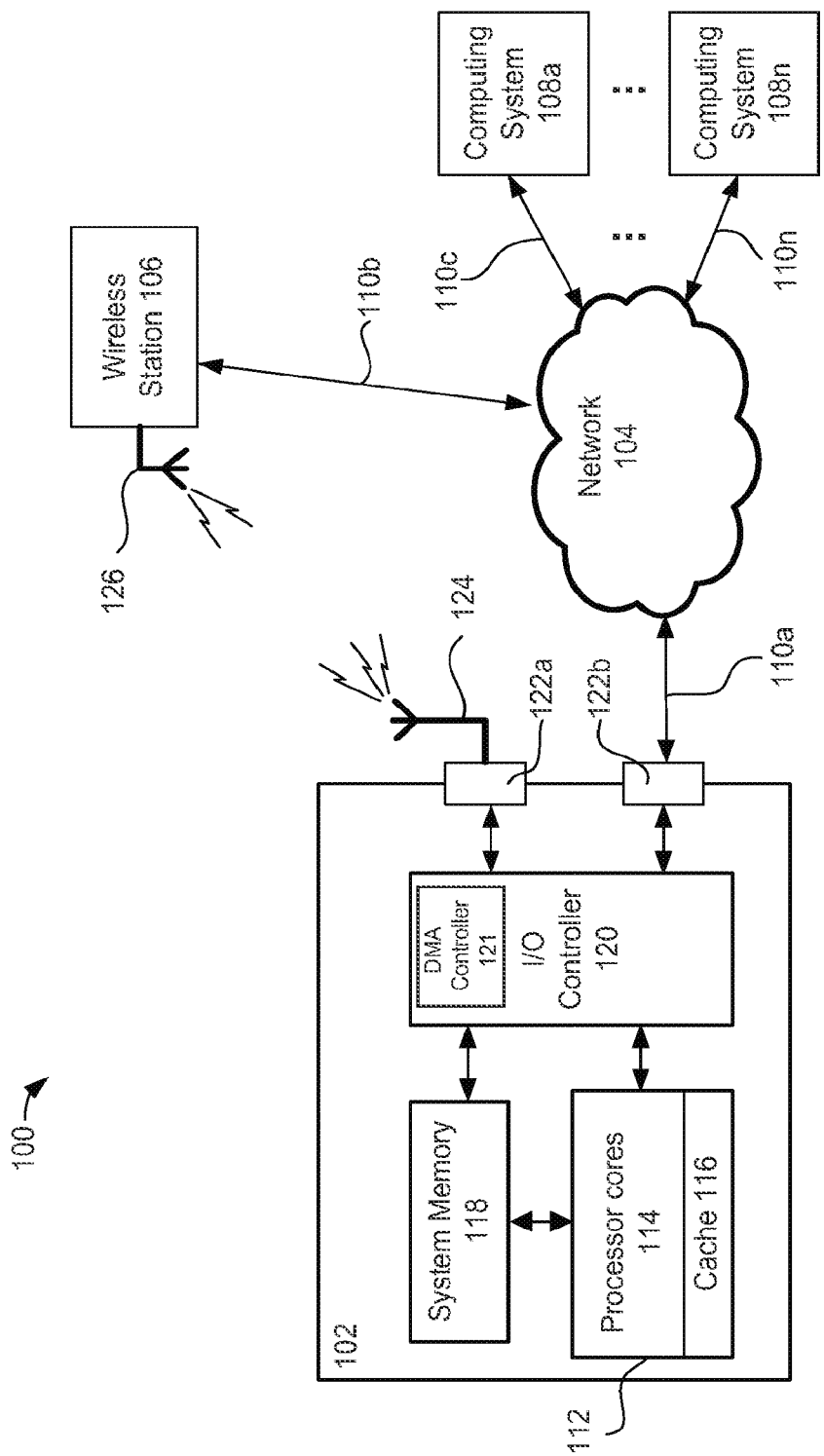
FIG. 1 describes a block diagram of a network system including a computer apparatus, according to various embodiments of the present disclosure.

FIG. 1 illustrates a network system 100 suitable for practicing embodiments of the present disclosure. Network system 100 may include a computer apparatus 102, a network 104, a wireless station 106, and a number computing systems 108a to 108n (collectively, 108).

Network 104 may be communicatively coupled to computer apparatus 102, wireless station 106, and the number of computing systems 108 via one or more connections 110a, 110b, 110c to 110n (collectively, 110). Network 104 may be an intranet or the Internet. Network 104 may include one or more computing devices or servers configured to receive data, provide data, and/or reply to requests for other information. Network 104 may be configured to transmit data from any of wireless station 106 and computing systems 108 to computer apparatus 102, or vice-versa. According various embodiments, wireless station 106 may be a wireless cellular tower, a Wi-Fi transceiver, or a satellite orbiting the Earth. Computing systems 108 may be servers, personal computers, mobiles devices, or other electronic devices that are communicatively coupleable to network 104. According to various embodiments, connections 110 may be either wired connections or wireless connections to enable an exchange of information with network 104.

Computer apparatus 102 may be configured to transfer data to and from network 104. Computer apparatus 102 may be any one of a number of computing devices that may be operatively coupled to network 104. For example, computer apparatus 102 may be a laptop, a netbook, a notebook, an ultrabook, a smartphone, a tablet, a personal digital assistant, an ultra mobile PC, a mobile phone, a desktop computer, a server, a printer, a scanner, a monitor, a set-top box, an entertainment control unit, a digital camera, a portable music player, or a digital video recorder. Computer apparatus 102 may include a processor 112 which may include one or more processor cores 114 and may include one or more levels of cache 116. In various embodiments, the processor 112 comprises a central processing unit (CPU). Computer apparatus 102 may also include system memory 118 (e.g., RAM), an I/O controller 120, and I/O devices 122a, 122b (collectively 122).

According to one embodiment, computer apparatus 102 may be configured to transfer data from I/O devices 122 to a portion of one or more levels of cache 116 that may be reserved for use by an application. For example, I/O device 122a may be a wireless network interface configured to wirelessly receive streaming data. I/O device 122a may use an antenna 124 to receive the streaming data that may have been transmitted by wireless station 106 from an antenna 126. I/O controller 120 may make the received data available for processor 112 without storing the data in system memory 118. Processor 112 may then be configured to transfer the received data directly from I/O controller 120 to the application-reserved portion of one or more levels of cache 116. According to one embodiment, processor 112 may be configured to use one of the one or more processor cores 114 to transfer the received data from I/O controller 120 to the application-reserved portion of one or more levels of cache 116. According to another embodiment, processor 112 may include a memory controller (shown in FIG. 2) that may be configured to receive or fetch the received data from I/O controller 120 and that may be configured to directly store the received data in the application-reserved portion of one or more levels of cache 116.

According to other various embodiments of the disclosure, I/O controller 120 may be configured to transfer the received data from I/O device 122a and may be configured to store the data directly in the application-reserved portion of one or more levels of cache 116. More specifically, I/O controller 120 may include a memory controller configured to bypass system memory 118 to store data directly in the application-reserved one or more levels of cache 116.

In embodiments, I/O controller 120 may include a direct memory access (DMA) controller 121 which may work in conjunction with a memory controller (e.g., memory controller 218 of FIG. 2) of processor 112 to transfer data directly to the application-reserved portion of cache of one or more levels of cache 116. For example, DMA controller 121 may be configured to notify I/O controller 120 if one or more I/O devices 122 has received data. DMA controller 121 may be configured to notify I/O controller 120 to pre-cache received data. The memory controller of processor 112 may then direct data from one or more DMA buffers or other buffers to the application-reserved portion of cache without first saving the data in system memory 118. According to various embodiments, DMA controller 121 may be external to I/O controller 120 and be configured to perform the above described functions.

According to other embodiments, I/O device 122b may receive data from network 104. I/O device 122b may be an ethernet-based network card; a cable, fiber-optic, or digital subscriber line (DSL) modem; or similar network interface device. I/O controller 120 or processor 112 may be configured to transfer the data received by I/O device 122b directly into an application-reserved portion of one or more levels of cache 116. While a few specific examples are provided for I/O devices 122, I/O devices 122 may be any peripheral device configured to transfer data to or/and from outside of computer apparatus 102 and which may or may not be configured to receive data from network 104.

Figure 2:
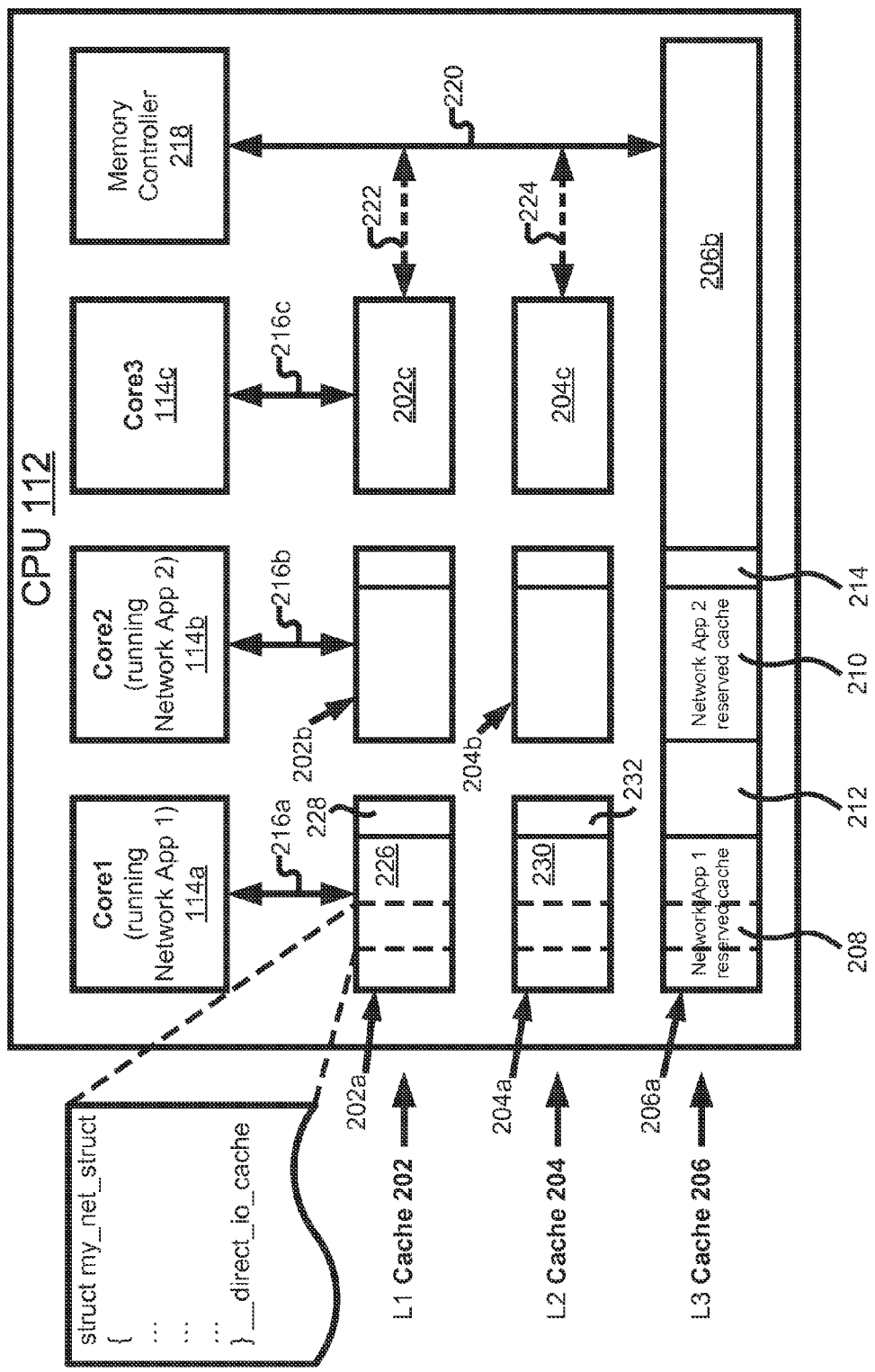
FIG. 2 describes a block diagram of an implementation of the computer apparatus of FIG. 1, according to various embodiments of the present disclosure.

FIG. 2 illustrates an example of an implementation of cache 116 in processor 112, according to various embodiments of the disclosure.

As shown, one or more processor cores 114 of processor 112 may include a number of processor cores 114a, 114b, 114c (collectively, 114). While three processor cores 114 are illustrated, one or more processor cores 114 may include 2, 4, or any number of processor cores, according to various embodiments. Each of the one or more processor cores 114 may include one or more logical processors and instruction execution engines. Each of the one or more processor cores 114 may be dedicated to execute instructions associated with a single application, such as a network application. For example, processor core 114a may be reserved or dedicated to run a first network application (Network App 1), and processor core 114b may be reserved or dedicated to run a second network application (Network App 2). According to various embodiments, each of the network applications may include functionality to support video streaming, audio streaming, video conferencing, real-time video game data, or other data received via I/O devices 122. According to another embodiment, each of one or more processor cores 114 may be configured to run an application independently from each other of one or more processor cores 114.

One or more levels of cache 116 (shown in FIG. 1) may include a first level (L1) of cache 202, a second level (L2) of cache 204, and a third level (L3) of cache 206. One or more levels of cache 116 may include static RAM (SRAM), dynamic RAM (DRAM), or/and synchronous dynamic RAM (SDRAM). Each of first and second levels of cache 202 and 204 may be configured to be accessed by one of the one or more processor cores 114. For example, first level of cache 202 may include: logical block 202a that is accessible by processor core 114a, logical block 202b that is accessible by processor core 114b, and logical block 202c that is accessible by processor core 114c. Similarly, second level of cache 204 may include: logical block 204a that is accessible by processor core 114a, logical block 204b that is accessible by processor core 114b, and logical block 204c that is accessible by processor core 114c. Each logical block of first level of cache 202 and second level of cache 204 may be programmatically reserved, dedicated, or allocated as general use cache that is operable to store data for any use of the respective processor.

Third level of cache 206 may be configured to be accessible by any of one or more processor cores 114. That is, any of one or more processor cores 114 may read and/or write data and/or instructions to third level of cache 206. Third level of cache 206 may also be programmatically separated to include more than one logical block of memory locations. For example, third level of cache 206 may also include a logical block 206b of memory locations that may be allocated for general use by any of one or more processor cores 114. As used herein and according to one embodiment, direct I/O data is data that may transferred directly between one of I/O devices 122 and one or more levels of cache 114. In other words, direct I/O data is data that may be transferred directly to and/or from one or more levels of cache 114 without first being saved in system memory 118, such as RAM. Third level of cache 206 may also include a logical block 206a of memory locations that may be reserved for direct I/O data.

Logical block 206a may be configured to be selectively reserved, dedicated, or programmatically allocated for use by one or more specific applications, according to one embodiment. For example, logical block 206a may include an application-reserved logical block 208 of memory locations of third level of cache 206. Logical block 208 may be dedicated to receive direct I/O data associated with a first application (e.g., Network App 1) that may be running on processor core 114a. Logical block 208 may be reserved such that data, other than direct I/O data associated with the first application, may not be written to logical block 208.

According to other embodiments, logical block 206a may include an application-reserved logical block 210 of memory locations of third level of cache 206. Logical block 210 may be dedicated to receive direct I/O data associated with a second application (e.g., Network App 2) that may be running on processor core 114b. Logical block 210 may be reserved such that data, other than direct I/O data associated with the second application, may not be written to logical block 210.

According to various embodiments, the first and second applications may each be network-related applications.

While portions of logical block 206a may be reserved for logical blocks 208 and 210, other portions of logical block 206a may continued to be allocated for direct I/O use by any application running on any of one or more processor cores 114. For example, logical block 206a may include logical blocks 212 and 214. Logical blocks 212 and 214 may continue to be allocated as general direct I/O use while logical blocks 208 and 210 may each be reserved for use by a respective specific application.

Processor 112 may be configured to transfer direct I/O data to or from application-reserved logical blocks 208 and/or 210 using a variety of techniques. For example, according to one embodiment, I/O controller 120 may be configured to generate and provide a notification to processor 112 if I/O controller 120 receives data from I/O devices 122. Processor 112 may configure processor core 114a to run a first application and may reserve logical block 208 for use by the first application. Processor core 114a may be configured to transfer data from I/O controller 120 directly to logical block 208, in response to receiving a notification from I/O controller 120. According to one embodiment, processor cores 114 may access respective memory locations of cache 116 via one or more buses 216, and processor core 114a may access logical block 208 via bus 216a.

According to another embodiment, the notification provided by I/O controller 120 may be an application specific notification. For example, I/O controller 120 may be configured to provide a first notification if data is received by computer apparatus 102 that is associated with a first application and may be configured to provide a second notification if data is received that is associated with a second application. Accordingly, processor core 114a may be configured to transfer data from I/O controller 120 directly to logical block 208, in response to receiving the first notification from I/O controller 120.

Alternatively, processor 112 may configure a memory controller 218 to transfer received data directly from I/O controller 120 to one or more logical blocks 208 and 210. Processor 112 may configure memory controller 218 to directly transfer received data from I/O controller 120 to logical block 208, in response to receiving the first notification. Processor 112 may further configure memory controller 218 to directly transfer received data from I/O controller 120 to logical block 210, in response to receiving a second notification. According to one embodiment, memory controller 218 transfers data directly to logical blocks 206a, 208, 210, 212, and 214 via bus 220. According to another embodiment, memory controller 218 may be configured to transfer data directly to first level of cache memory 202 and to second level of cache memory 204 via bus 222 and bus 224, respectively.

Advantageously, reserving one or more blocks of memory locations in cache 116 for use by one or more specific applications may decrease data access times by processor cores 114. Typically, when a processor reads a byte of data, the processor first searches a first level of cache, e.g., first level of cache 202. If the processor does not find the sought data in the first level of cache (a cache miss), the processor may search other levels of cache, e.g. second level of cache 204 and third level of cache 206. If the processor does not find the sought data in one of the other levels of cache, the processor searches system memory 118. Typically, the first level of cache is smaller than a second level of cache, and the second level of cache is smaller than subsequent levels of cache (if subsequent levels exist). First, second, and subsequent levels of cache are typically significantly smaller than system memory, e.g., system memory 118, and are typically fabricated in memory architectures having faster access times than system memory. Thus, by reserving processor core 114a for the first application, by reserving logical block 208 to store data associated with the first application, and by directly transferring data associated with the first application from I/O controller 120 to logical block 208, processor 112 and processor core 114a may execute the first application faster than conventional CPU architectures.

According to various embodiments, processor 112 may operate a cache algorithm or replacement policy that may cause application data associated with the first application to be copied or distributed into logical block 202a and/or logical block 204a. Logical block 202a may include a portion 226 that may be storing data associated with the first application and a portion 228 allocated for general use. Logical block 204a may include a portion 230 that may be storing data associated with the first application and a portion 232 allocated for general use. The cache algorithm or replacement policy may cause application data associated with the second application to be copied or distributed into logical block 202b and/or logical block 204b. Accordingly, logical block 202b and logical block 204b may include portions that are in use by the second application and portions that are allocated for general use.

FIG. 2 shows a data structure my_nct_struct which may represent instructions provided to processor 112 to associate an application with one or more logical blocks 206a, 208, and 210 for direct I/O data use and, more particularly, for application-specific use of logical blocks 208 and 210. The data structure my_net_struct may be a network related structure of the first application (Network App 1) and have a compiler directive that causes a compiler to create such processor opcodes that pin the data structure my_net_struct in the first application reserved cache, e.g. logical block 208 or 210. According to various embodiments, processor 112 may include opcodes that enable the data structure my_net_struct to associate application-reserved cache with specific applications. Processor 112 may be configured to be responsive to opcodes which, if run by one or more processors 114, reserve one or more blocks or segments of one or more levels of cache 116 for use by a specific application.

According to various embodiments of the disclosure, a compiler may be configured to receive instructions from a user and translate the received instructions into one or more opcodes operable to reserve an application-specific block or segment of cache. Example compilers that may be configured include Intel Compiler®, GCC, MSFT Visual Studio®, and the like. Example processors that may be modified to include one or more embodiments of the present disclosure include processors manufactured by AMD®, ARM®, FreeScale®, Broadcom®, and Cavium®. According to various embodiments, example architectures that may be modified to include one or more embodiments of the present disclosure include reduced instruction set computing (RISC), complex instruction set computing (CISC), and digital signal processors (DSP).

While various embodiments of computer system 102 and processor 112 describe transferring or writing data directly to application-reserved logical blocks 208 and 210, computer system 108 and processor 112 may be configured to directly transfer data from one or more levels of cache 116 to I/O controller 120, bypassing system memory 118, according to various additional embodiments of the disclosure. More specifically, processor core 114a or memory controller 218 may be configured to transfer data directly from one or more logical blocks 208 and 210 to I/O controller 120. According to other embodiments, I/O controller 120 may be integrated into I/O devices 122, so data may be transferred directly from one or more levels of cache 116 directly to I/O devices 122.

Figure 3:
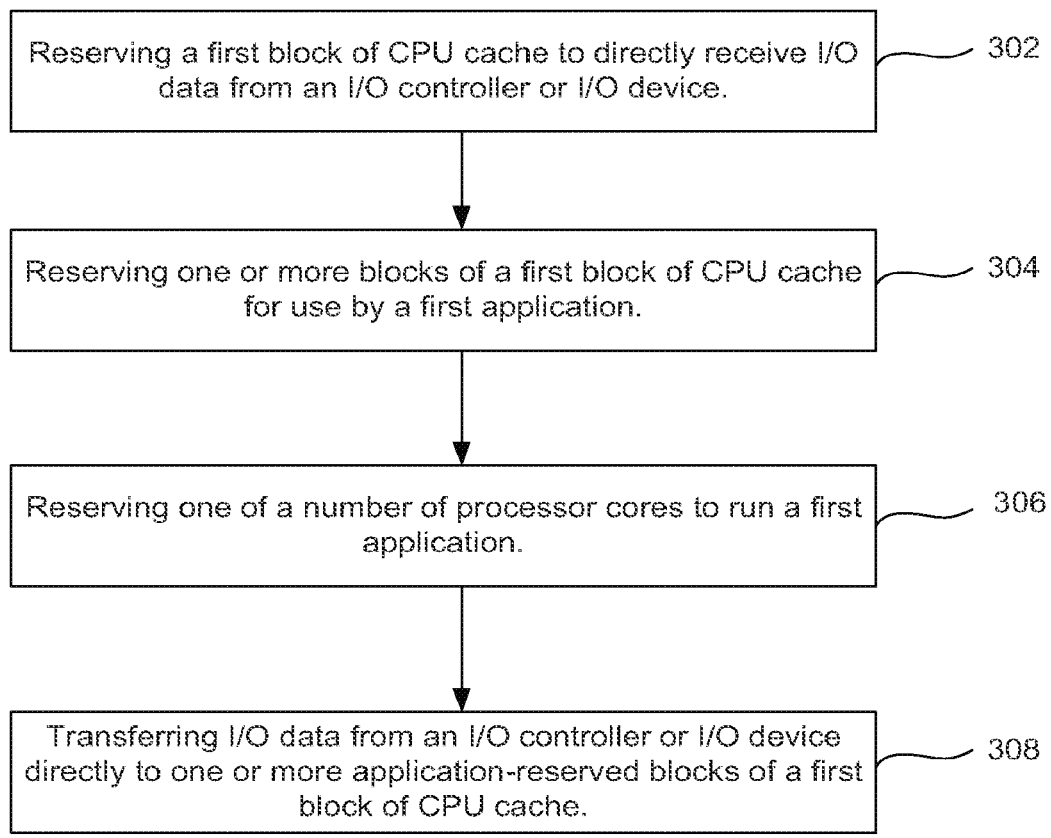
FIG. 3 describes a flow chart of an operation of the computer apparatus of FIG. 2, according to various embodiments of the present disclosure.

FIG. 3 illustrates a method for transferring I/O data from an I/O controller or an I/O device directly to an application-reserved block of CPU cache, according to an embodiment of the disclosure.

At block 302, a CPU reserves a first block of cache to directly receive I/O data from an I/O controller or I/O device. The CPU may reserve the first block of cache by executing a number of instructions with a processor core. According to one embodiment, the I/O data may be data received from a network.

At block 304, the CPU reserves one or more blocks of the first block for use by a first application. The CPU may reserve the one or more blocks by executing a number of instructions with a processor core. According to one embodiment, the first application may be a network application.

At block 306, the CPU reserves one of a number of processor cores to run the first application.

At block 308, the CPU transfers I/O data from an I/O controller or I/O device directly to the one or more blocks of the first block of cache. The CPU may transfer the I/O data by causing the reserved processor core to execute instructions to transfer the I/O data. Alternatively, the CPU may transfer the I/O data by causing a memory controller to transfer the I/O data to the one or more blocks of the first block cache.

Figure 4:
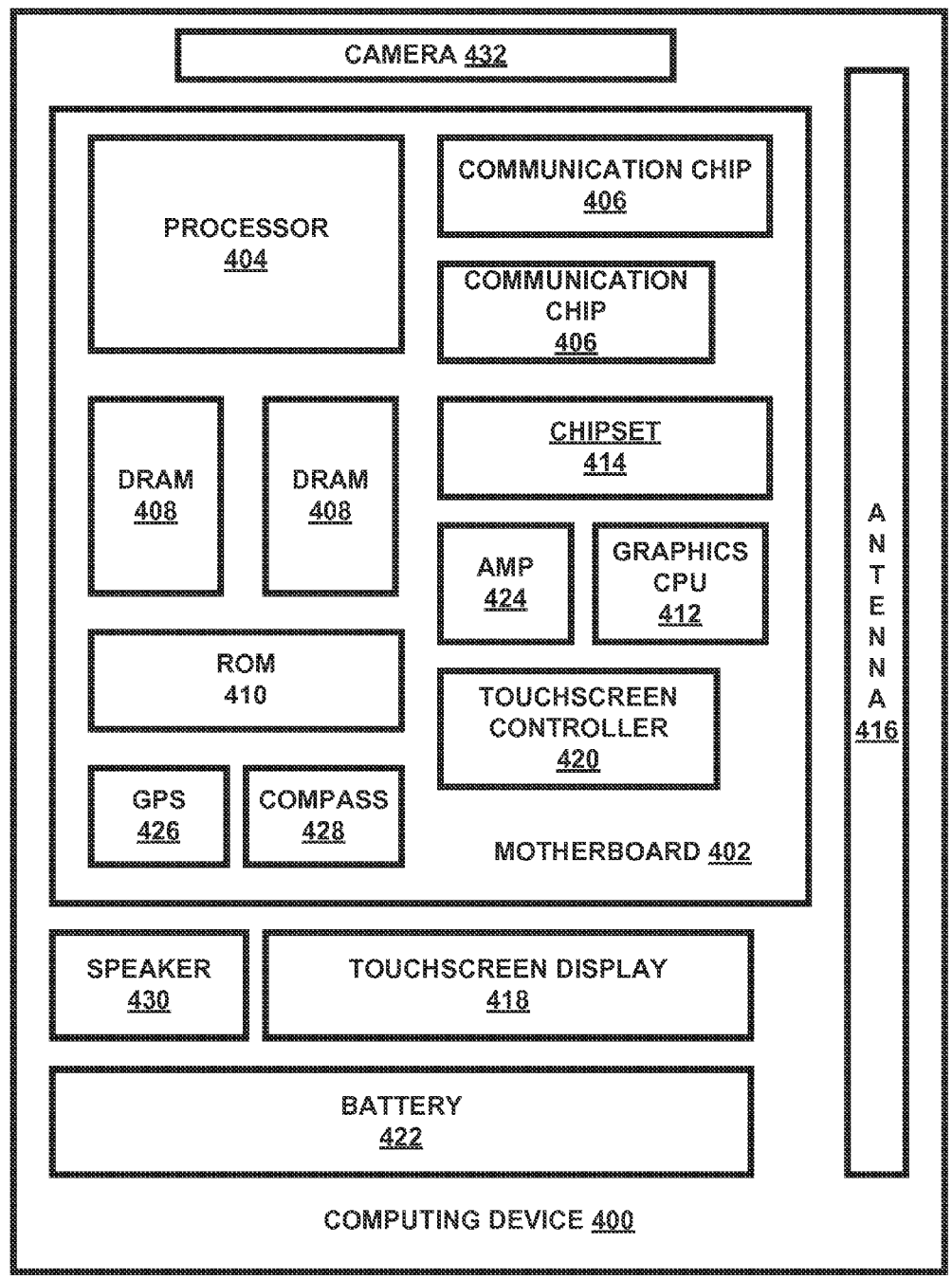
FIG. 4 describes a block diagram of an implementation of the computer apparatus of FIG. 1, according to various embodiments of the present disclosure.

FIG. 4 illustrates a computing device 400 in accordance with one implementation of the invention. The computing device 400 houses a board 402. The board 402 may include a number of components, including but not limited to a processor 404 and at least one communication chip 406. The processor 404 may be physically and electrically coupled to the board 402. In some implementations the at least one communication chip 406 may also be physically and electrically coupled to the board 402. In further implementations, the communication chip 406 may be part of the processor 404.

Depending on its applications, computing device 400 may include other components that may or may not be physically and electrically coupled to the board 402. These other components include, but are not limited to, volatile memory (e.g., DRAM 408), non-volatile memory (e.g., ROM 410), flash memory, a graphics processor 412, a digital signal processor, a crypto processor, a chipset 414, an antenna 416, a display, a touchscreen display 418, a touchscreen controller 420, a battery 422, an audio codec, a video codec, a power amplifier 424, a global positioning system (GPS) device 426, a compass 428, an accelerometer, a gyroscope, a speaker 430, a camera 432, and a mass storage device (such as hard disk drive, compact disk (CD), digital versatile disk (DVD), and so forth).

The communication chip 406 enables wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth®, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth® and a second communication chip 406 may be dedicated to longer range wireless communications such as GPS, EDGE, GPRS, CDMA, WiMAX, LTE, Ev-DO, and others.

The processor 404 of the computing device 400 includes an integrated circuit die packaged within the processor 404. In some implementations of the disclosure, the integrated circuit die of the processor includes one or more devices, such as cache 116 and memory controller 218 operably configured according to embodiments of the disclosure. The term "processor" may refer to any device or portion of a device that processes electronic data from registers and/or memory to transform that electronic data into other electronic data that may be stored in registers and/or memory.

The communication chip 406 also includes an integrated circuit die packaged within the communication chip 406. In accordance with another implementation of the disclosure, the integrated circuit die of the communication chip includes one or more devices, such as I/O devices 122, configured to communicate with external devices and/or systems.

In further implementations, another component housed within the computing device 400 may contain an integrated circuit die that includes one or more devices, such as processor cores, cache and one or more memory controllers.

In various implementations, the computing device 400 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 400 may be any other electronic device that processes data.

According to various embodiments of the disclosure, a computer readable medium may have a number of instructions configured to enable a computing device, in response to execution of the instructions by a processor of the computing device, to reserve use of a portion of one of a number of levels of cache for an application executed by the processor. The instruction may enable the computing device to transfer data associated with the application from an input/output (I/O) device of the computing device directly to the portion of the one of the number of levels of cache. The instructions may enable the computing device to dedicate one of a number of cores of the processor to execute instructions associated with the application.

In embodiments, the one of the number of levels of cache may be a third level of cache, and the number of levels of cache may include a first level, a second level, and the third level.

In embodiments, the third level of cache may be shared between a number of cores of the processor. The portion may be a first portion, and a second portion of the third level of cache may be associated with a first core and a second core of the number of cores and may be dedicated to directly receiving data from the I/O device.

In embodiments, the I/O device may be a network interface device of the computing device.

The data may be I/O streaming data received from a second computing device which may be communicatively coupled to the computing device through a network. According to various embodiments, a method may include reserving, by one of a number of cores of a processor, use of a portion of one of a number of levels of cache for an application executed by the one of the number of cores. The method may also include transferring, by the one of the number of cores, data associated with the application from an input/output (I/O) device of a computing device directly to the portion of the one of the number of levels of the cache.

In embodiments, the number of levels of the cache may include a first level of the cache, a second level of the cache, and a third level of the cache. The one of the number of levels may be the third level of the cache. The method may further include accessing the data in the third level of the cache, and copying the accessed data to one of the first and the second level of the cache.

In embodiments, the method may include dedicating any one of the number of cores to execute instructions associated with the application, and the application may be related to transferring data via a network.

According to various embodiments, a computing device may include a motherboard, a communication chip mounted on the motherboard, random access memory (RAM) mounted on the motherboard a number of levels of cache communicatively coupled to the RAM, and a processor. The processor may be mounted on the motherboard and may have a number of cores. Each of the number of cores may be configured to execute instructions to allocate a portion of at least one of the number of levels of the cache to an application and to allocate the portion of the at least one of the number of levels to one of the number of cores. The computing device may be configured to transfer data received by the network interface device directly, without first saving the data to the RAM, to the allocated portion of the at least one of the number of levels of the cache.

In embodiments, the computing device may include a memory controller that may be configured to transfer the data from the network interface directly to the allocated portion of the cache.

In embodiments, the allocated portion of the cache may be a direct input/output memory structure.

In embodiments, the computing device may further include a display device operatively coupled to the motherboard. The display device may be a touch screen.

In embodiments, the computing device may be a selected one of a laptop, a netbook, a notebook, an ultrabook, a smartphone, a tablet, a personal digital assistant, an ultra mobile PC, a mobile phone, a desktop computer, a server, a printer, a scanner, a monitor, a set-top box, an entertainment control unit, a digital camera, a portable music player, or a digital video recorder.

In embodiments, the computing device may include a touchscreen display device operatively coupled with the motherboard.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Specific features of any of the above described embodiments may be fully or partially combined with one or more other embodiments, either wholly or partially, to form new embodiments of the disclosure.

What is claimed is:

1. A non-transitory computer readable medium having a plurality of instructions to cause a computing device, in response to execution of the instructions by a processor of the computing device, to:

dedicate and reserve use of a first portion of one of a plurality of levels of cache for a first application executed by a first processor core of the processor, wherein the one of the plurality of levels of cache is shared and accessible by the first processor core and a second processor core of the processor, but while the first portion of the one of the plurality of levels of cache is dedicated and reserved for the first application executed by the first processor core, only operations associated with the first application executed by the first processor core can access the first portion of the one of the plurality of levels of cache;

dedicate and reserve use of a second portion of the one of the plurality of levels of cache for a second application executed by the second processor core of the processor, wherein the first and second portions are different portions of the one of the plurality of levels of cache shared and accessible by both the first and second processor cores, but while the second portion of the one of the plurality of levels of cache is dedicated and reserved for the second application executed by the second processor core, only operations associated with the second application executed by the first processor core can access the second portion of the one of the plurality of levels of cache; and transfer data associated with the first application from an input/output (I/O) device of the computing device directly to the first portion of the one of the plurality of levels of cache;

wherein the plurality of levels of cache, in addition to the one level of cache shared and accessible by both the first and second processor cores, further include another level of cache disposed between the first and second processor cores and the one of the plurality of levels of cache shared and accessible by both the first and second processor cores, except having the first portion and the second portion that are respectively dedicated, reserved and accessible only to the corresponding first and second applications of the first and second processor cores, while dedicated and reserved for the first and second applications of the first and second processor cores.

2. The non-transitory computer readable medium of claim 1, wherein the instructions further cause the computing device to:

dedicate and reserve the first processor core to execute instructions associated with the first application.

3. The non-transitory computer readable medium of claim 1, wherein the one of the plurality of levels of cache is a third level of cache and the other level of the plurality of levels of cache is a second level of cache, wherein the plurality of levels of cache include a first level cache, the second level cache, and the third level cache; and wherein the first level cache includes a first portion and a second portion that are respectively dedicated, reserved and accessible only by the corresponding one of the first and second processor cores.

4. The non-transitory computer readable medium of claim 1, wherein the I/O device is a network interface device of the computing device.

5. The non-transitory computer readable medium of claim 1, wherein the data is I/O streaming data received from a second computing device communicatively coupled to the computing device through a network.

6. A method, comprising:
dedicating and reserving, by a processor that includes a plurality of cores and a plurality of level of caches, use of a first portion of one of the plurality of levels of cache for a first application executed by a first core of the plurality of cores, wherein the one of the plurality of levels of cache is shared and accessible by the plurality of cores, but while the first portion of the one of the plurality of levels of cache is dedicated and reserved for the first application executed by the first processor core, only operations associated with the first application executed by the first processor core can access the first portion of the one of the plurality of levels of cache;
dedicating and reserving, by the processor, use of a second portion of the one of the plurality of levels of cache for a second application executed by a second core of the plurality of cores, wherein the first and second portions are different portions of the one of the plurality of levels of cache shared and accessible by both the first and second cores, but while the second portion of the one of the plurality of levels of cache is dedicated and reserved for the second application executed by the second processor core, only operations associated with the second application executed by the second processor core can access the second portion of the one of the plurality of levels of cache; and
transferring, by the processor, data associated with the first application from an input/output (I/O) device of a computing device directly to the first portion of the one of the plurality of levels of the cache;
wherein the plurality of levels of cache, in addition to the one level of cache shared and accessible by both the first and second processor cores, further include another level of cache disposed between the first and second cores and the one of the plurality of levels of cache shared and accessible by both the first and second cores, having the first portion and the second portion that are respectively dedicated, reserved and accessible only to the corresponding first and second applications of the first and second cores, while dedicated and reserved for the first and second applications of the first and second processor cores.

7. The method of claim 6, wherein the plurality of levels of the cache include a first level of the cache, a second level of the cache, and a third level of the cache, the one of the plurality of levels is the third level of the cache, the other level is the second level of the cache, and the first level of the cache includes a first portion and a second portion that are respectively dedicated, reserved and accessible only by the first and second cores, the method further comprising:
accessing, by the processor, the data in the third level of the cache; and copying, by the processor, the accessed data to one of the first and the second levels of the cache.

8. The method of claim 6, further including:
dedicating and reserving the first core to execute instructions associated with the first application, wherein the first application is related to transferring data via a network.

9. A computing device, comprising:
a motherboard;
a communication chip mounted on the motherboard;
random access memory (RAM) mounted on the motherboard; and
a processor coupled with the communication chip and the RAM, having a plurality of cores and a plurality of levels of cache, wherein one of the plurality of levels of cache is sharable and accessible by the plurality of cores, and in addition, another one of the plurality of levels of cache has portions respectively dedicated, reserved, and accessible only by corresponding ones of the plurality of cores;
wherein a first portion of the shared one of the plurality of levels of the cache is dedicated and reserved to a first application of a first one of the plurality of cores, and a second portion of the shared one of the plurality of levels of the cache is dedicated and reserved to a second application of a second one of the plurality of cores, but while the first and second portions of the shared one of the plurality of levels of cache are respectively dedicated and reserved for the first and second applications executed by the first and second processor cores, only operations associated with the first and second applications respectively executed by the first and second processor cores can access the respective first and second portions of the otherwise shared one of the plurality of levels of cache; and
wherein the computing device is to transfer data received by the communication chip from a network directly, without first saving the data to the RAM, to the dedicated and reserved first portion or second portion of the shared one of the plurality of levels of the cache.

10. The computing device of claim 9, further including a memory controller to transfer the data from the communication chip directly to the dedicated and reserved first portion or second portion of the cache.

11. The computing device of claim 9, wherein the dedicated and reserved first portion or second portion of the cache is a direct input/output memory structure.

12. The computing device of claim 9, further comprising a display device operatively coupled to the motherboard.

13. The computing device of claim 12, wherein the display device is a touch screen.

14. The computing device of claim 9, wherein the computing device is a selected one of a laptop, a netbook, a notebook, an ultrabook, a smartphone, a tablet, a personal digital assistant, an ultra mobile PC, a mobile phone, a desktop computer, a server, a printer, a scanner, a monitor, a set-top box, an entertainment control unit, a digital camera, a portable music player, or a digital video recorder.

15. The computing device of claim 9, further comprising a touchscreen display device operatively coupled with the motherboard.

* * * * *